May 23, 1939.　　　J. C. PATERSON　　　2,159,044
FEEDING DOUGH AND LIKE MATERIAL TO SHEETING AND LIKE MACHINES
Filed Oct. 21, 1936
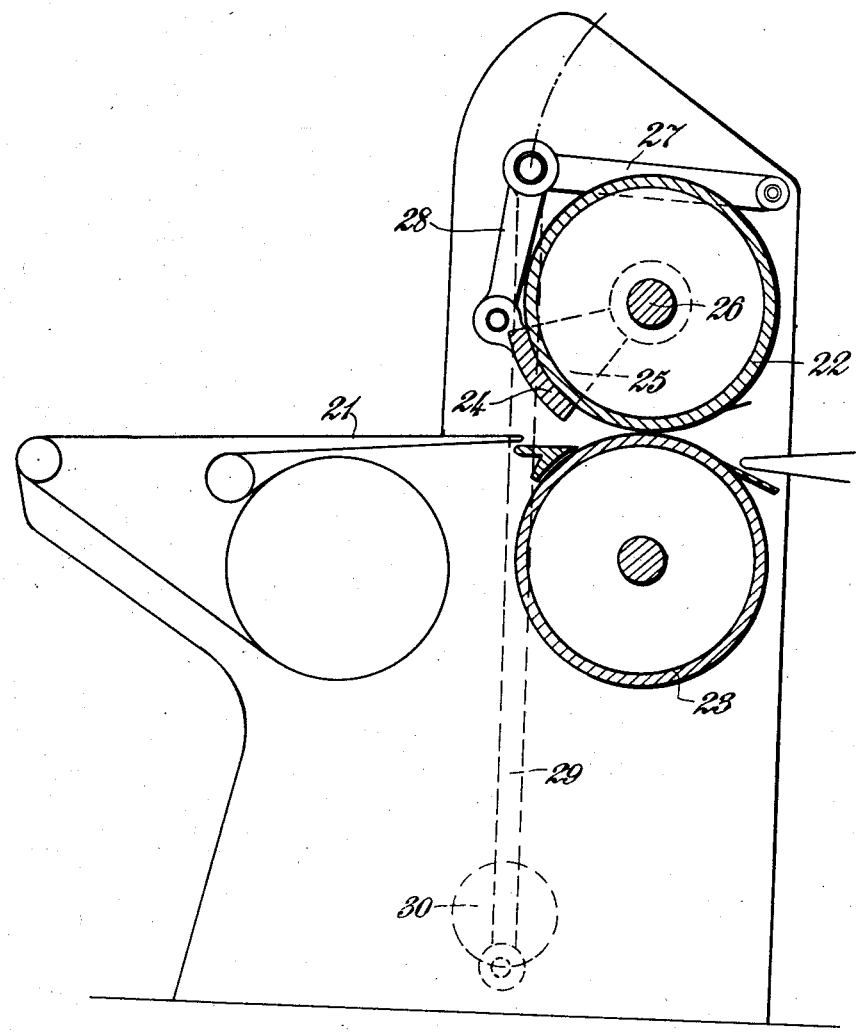

Patented May 23, 1939

2,159,044

UNITED STATES PATENT OFFICE 2,159,044

FEEDING DOUGH AND LIKE MATERIAL TO SHEETING AND LIKE MACHINES

John Currie Paterson, Peterborough, England, assignor to Baker Perkins Company, Inc., Saginaw, Mich.

Application October 21, 1936, Serial No. 106,865
In Great Britain November 2, 1935

3 Claims. (Cl. 107—12)

This invention relates to machines for sheeting plastic material, such as dough (hereinafter referred to as "dough") of the type comprising a pair of rolls arranged one above the other into the bight of which dough is fed by means of a feeding web or conveyor.

In dough sheeting machines where dough is fed between rolls by means of a conveying surface the feeding of the dough is dependent upon the action of the conveyor and the gripping action of the rolls. This is not altogether satisfactory in that under all conditions a smooth and integral sheet of dough or one of constant gauge is not ensured and an object of the present invention is to provide an improved machine by which a uniform and solid supply of dough to the clearance between the rolls is ensured whereby a regular and uninterrupted flow of a smooth and solid sheet of unvarying gauge can be relied upon. The invention consists in a dough sheeting or like machine comprising a pair of rolls arranged one above the other, a feeding conveyor supporting and feeding the dough into the bight between the rolls, and mechanically operated tamping means co-operating with the upper roll to press dough supported by the conveyor into the bight between the rolls.

In the accompanying drawing the figure shows a diagrammatic side elevation of a biscuit dough sheeter or sheeter with tamping means according to the invention where the dough is fed from a conveyor.

In carrying the invention into effect according to one convenient mode the dough brake or sheeter comprises superposed rolls 22, 23 and a conveyor band 21 which supports the dough and feeds it into the bight between the rolls 22, 23. An arcuate tamping or treading plate 24 is mounted upon arms 25 pivoted upon the shaft 26 of the roll 22. The plate 24 is connected at its ends to oscillating arms 27 by links 28. The arms 27 are coupled by connecting rods 29 to crank discs 30 whereby the desired oscillatory motions are imparted to the tamping plate 24 to urge the dough being fed by the conveyor band into the bight between the rolls.

It is to be understood that the invention is not limited in respect to the use of a plate for forcing the dough into the bight of the rolls, as a bar or slat may be used in lieu thereof. Similarly the motion of the tamping device need not be an arcuate oscillatory motion but may be a rectilinear reciprocatory one.

The amplitude of the oscillation or reciprocation of the tamping plate may be large or small according to the requirement of the dough under treatment or as required by the relative disposition of the rolls. Similarly the rate of oscillation or reciprocation may be determined or made variable according to the nature of the dough under treatment.

The invention may be applied to rotary dough moulding machines the oscillatory bar or plate ensuring an even feed and packing of the dough into the die cavities. In such case it is preferred to locate the tamping bar or plate in association with the pressure roll.

Having now described my invention what I claim as new and desire to secure by Letters Patent is:

1. In combination, a dough sheeting or like machine comprising a pair of rolls arranged one above the other, an endless conveyor band supporting and feeding dough into the bight between the rolls, a tamping device comprising a transverse arcuate plate mounted for oscillation about the axis of the upper roll and operative to press dough supported by said conveyor into said bight and power means for oscillating the tamping device.

2. In combination, a dough sheeting or like machine comprising a pair of rolls arranged one above the other, an endless conveyor band supporting and feeding dough into the bight between the rolls, a tamping device comprising a transverse arcuate plate, arms carrying said plate and pivoting about the axis of the upper roll and power operated crank means linked to said arms whereby the arcuate plate is oscillated to press dough supported by said conveyor into said bight.

3. In combination, a dough sheeting or like machine comprising a pair of rolls arranged one above the other, an endless conveyor band supporting the dough and feeding it into the bight between the rolls, and a tamping device operative to press dough supported by the conveyor into said bight, said device comprising an arcuate plate carried by arms pivoting about the axis of the upper roll, oscillating radius arms coupled to crank discs, and links connecting said radius arms to the arms carrying said arcuate plate.

JOHN CURRIE PATERSON.